(12) United States Patent
Akahori

(10) Patent No.: US 7,738,614 B2
(45) Date of Patent: Jun. 15, 2010

(54) DECISION TIMING SYNCHRONOUS CIRCUIT AND RECEIVER CIRCUIT

(75) Inventor: Hiroji Akahori, Tokyo (JP)

(73) Assignee: Oki Semiconductor Co., Ltd. (JP)

( * ) Notice: Subject to any disclaimer, the term of this patent is extended or adjusted under 35 U.S.C. 154(b) by 865 days.

(21) Appl. No.: 11/606,999

(22) Filed: Dec. 1, 2006

(65) Prior Publication Data

US 2007/0147565 A1    Jun. 28, 2007

(30) Foreign Application Priority Data

Dec. 28, 2005  (JP) ............................. 2005-378414

(51) Int. Cl.
*H04L 7/00* (2006.01)

(52) U.S. Cl. ................. 375/355; 375/373; 375/354; 370/503; 370/509; 370/512

(58) Field of Classification Search .............. 375/355, 375/354; 370/503, 509, 712
See application file for complete search history.

(56) References Cited

U.S. PATENT DOCUMENTS

| 5,311,554 | A | * | 5/1994 | Morera et al. | 375/316 |
|---|---|---|---|---|---|
| 5,999,561 | A | * | 12/1999 | Naden et al. | 375/142 |
| 6,009,118 | A | * | 12/1999 | Tiemann et al. | 375/150 |
| 6,373,861 | B1 | * | 4/2002 | Lee | 370/503 |
| 7,003,056 | B2 | * | 2/2006 | Chen | 375/343 |
| 7,010,612 | B1 | * | 3/2006 | Si et al. | 709/232 |
| 7,158,786 | B2 | * | 1/2007 | Shoji et al. | 455/435.1 |
| 2003/0095516 | A1 | * | 5/2003 | Ok et al. | 370/331 |
| 2006/0062317 | A1 | * | 3/2006 | Chang et al. | 375/260 |

* cited by examiner

*Primary Examiner*—Shuwang Liu
*Assistant Examiner*—Kenneth Lam
(74) *Attorney, Agent, or Firm*—Studebaker & Brackett PC; Donald R. Studebaker

(57) ABSTRACT

A circuit includes: a portion for performing a logical operation based on a binary modulated signal and a cyclic signal; serial-to-parallel converter for sampling a operation output for parallel output; correlation filter having multiple digital filters for allowing the parallel signal values to pass therethrough; maximum difference detector for detecting a maximum difference in a period during which a difference between the maximum and minimum output signal values from digital filters is greater than a threshold; timing detector for detecting the inversion timing of each output signal value; and decision timing exterminating portion for determining decision timing based on the maximum difference and the detected inversion timing.

13 Claims, 13 Drawing Sheets

4A

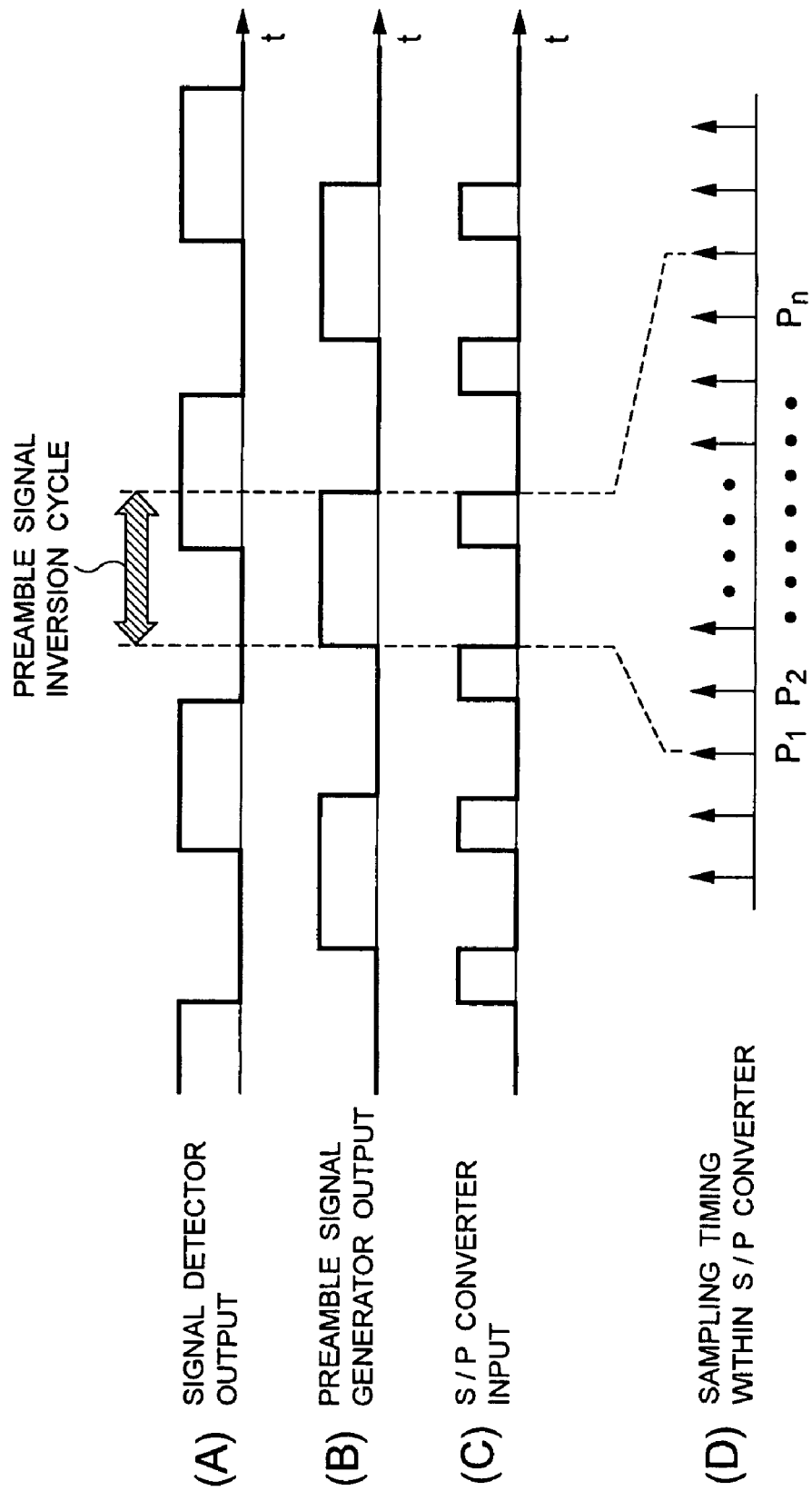

CORRELATION FILTER OUTPUT
WITHOUT NOISE

CORRELATION FILTER OUTPUT
WITH NOISE

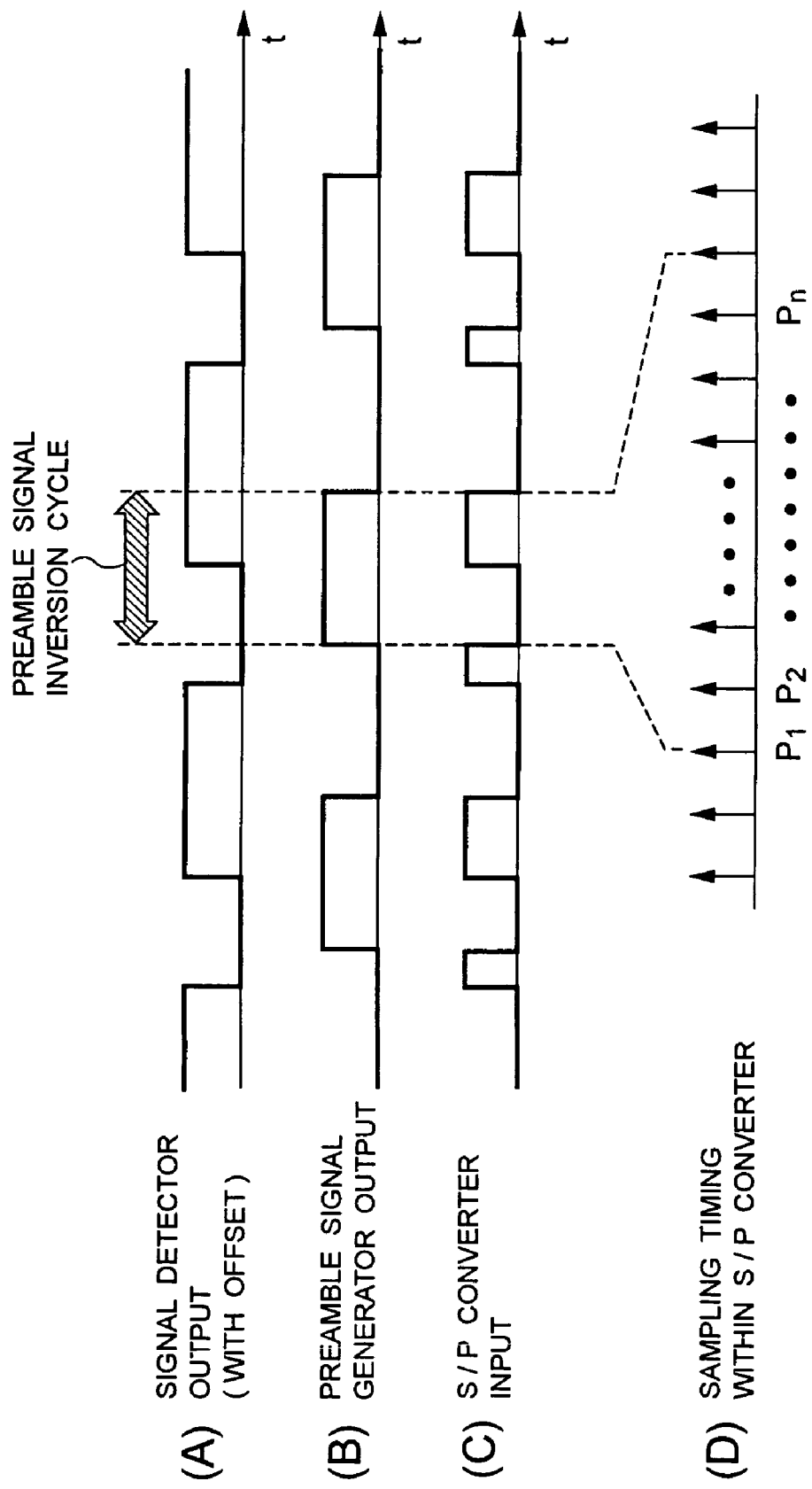

FIG. 5
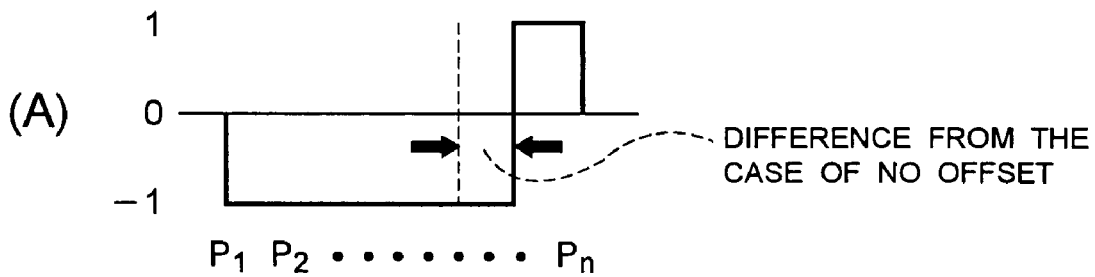
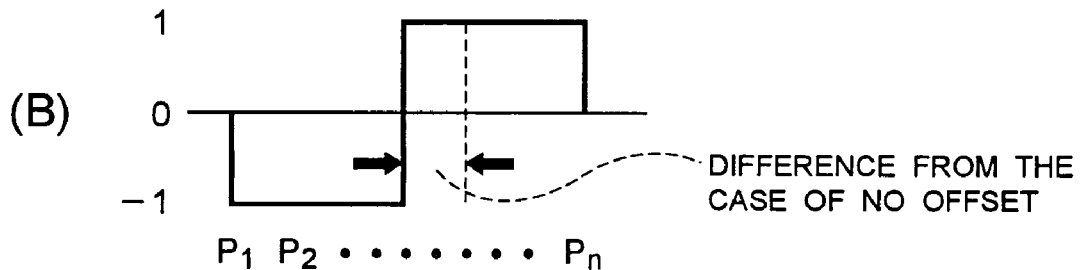
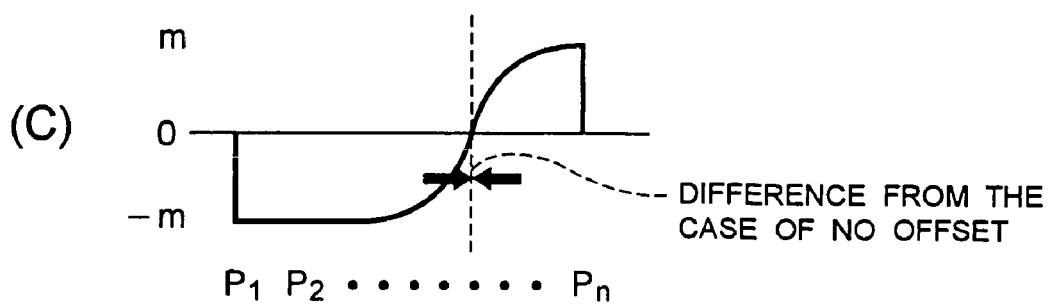

INTERPOLATOR INPUT
(CORRELATION FILTER
OUTPUT)

INTERPOLATOR OUTPUT
("0" CROSSING POINT
POSITION EXTRACTOR
INPUT)

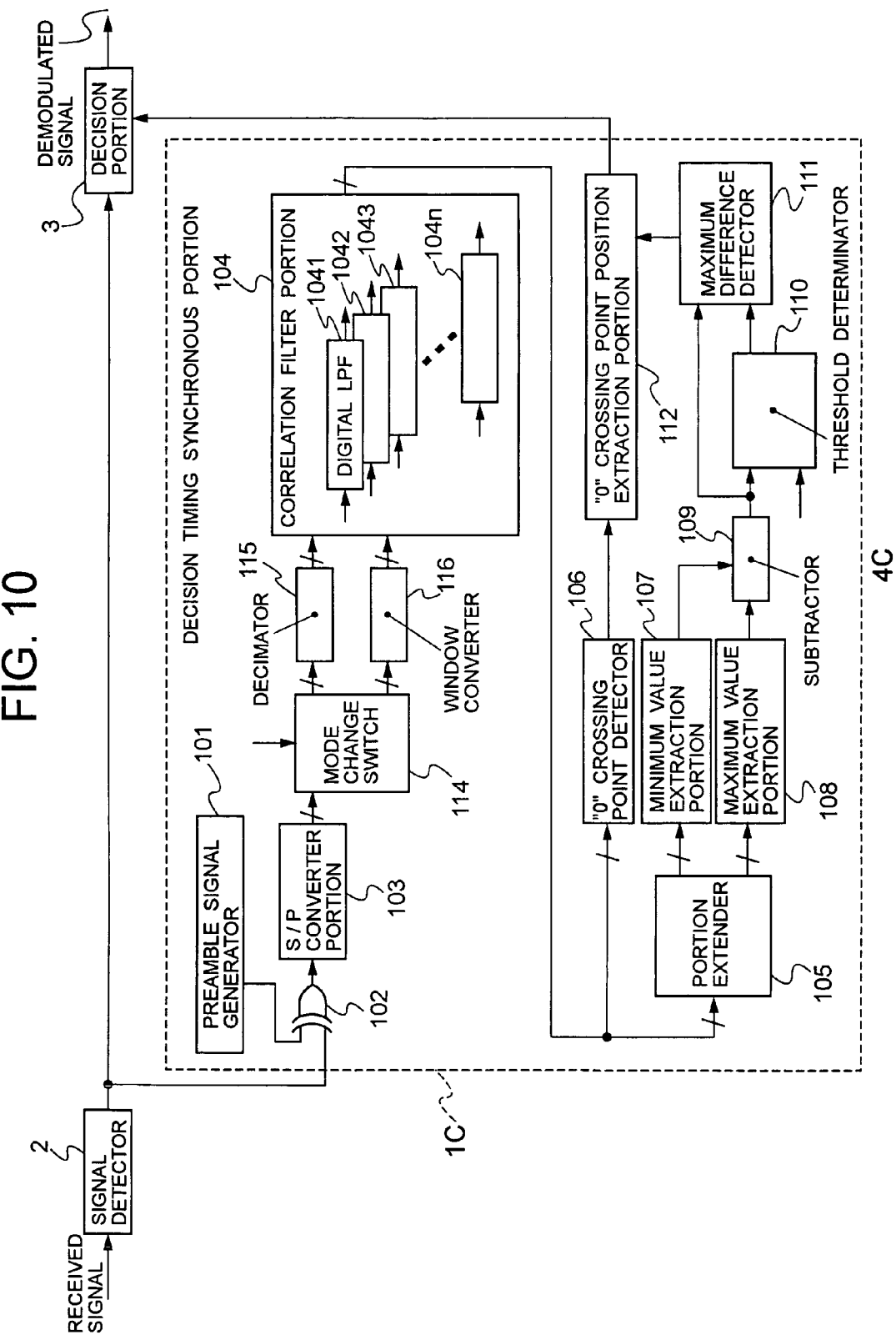

DECISION TIMING SYNCHRONOUS CIRCUIT AND RECEIVER CIRCUIT

BACKGROUND OF THE INVENTION

1. Field of the Invention

The present invention relates to decision a timing synchronous circuit and a receiver circuit, and more particularly, to a decision timing synchronous circuit and a receiver circuit which extract the optimum decision timing in generating a demodulated signal from a signal that is oversampled at a frequency higher than the modulation rate of a received signal.

2. Description of the Related Art

For example, Bluetooth (registered trademark) receivers in a Bluetooth system or a wireless communication system employ 2.4 GHz band radio signals. Such a Bluetooth receiver includes a RFIC (Radio Frequency Integrated Circuit) transceiver for extracting a baseband signal at a 1 MHz symbol transmission rate from the aforementioned 2.4 GHz band radio signals, and a baseband receiver circuit for assembling a packet from the extracted baseband signal (digital serial signal).

Transmission of the baseband signal is initiated at a time slot boundary at every 625 μs, allowing first a 4-bit-length preamble, then a 64-bit-length synchronization word, and finally a variable-length payload to be transmitted.

The baseband receiver circuit in a Bluetooth receiver performs oversampling at a frequency higher than the modulation rate of the received signal to extract the received signal at intervals of the number of times of sampling corresponding to the modulation rate of the received signal for comparison with a predefined preamble pattern. After it is determined that the comparison result (correlation value) is equal to or greater than a desired expectation value, a location at which the maximum correlation value is obtained exceeding a threshold value is recognized as the optimum decision timing for demodulation.

The conventional baseband receiver circuit reproduces a clock signal simply by detecting only the rising edge and/or the falling edge of a received baseband signal, allowing the clock signal to be used for sampling the baseband signal to reconstruct symbols.

However, the aforementioned decision timing recognition method that employs the conventional baseband receiver circuit has the following problems.

For example, assuming that "b" is the number of symbols of a preamble and "n" is the number of times of oversampling per one symbol, the conventional decision timing synchronous circuit requires $(b-1) \times (n+1)$ or more shift register stages. Accordingly, this leads to a tremendous increase in the scale of the circuit for determining decision timing.

Additionally, as described above, decision timing is conventionally recognized based on the maximum correlation value between a signal obtained by oversampling at a frequency higher than the modulation rate and the preamble pattern. However, when a received signal is provided in an environment without so much noise, a plurality of maximal correlation values appearing successively may make it uncertain where the optimum timing is available, thus causing it difficult to recognize the optimum decision timing simply with the correlation value.

Furthermore, an offset can occur in the output from a signal detector though it depends on the mechanism of demodulation of the receiver circuit. For example, the FSK (Frequency Shift Keying) can be employed possibly with a frequency offset, while the BPSK (Binary Phase Shift Keying) can be employed possibly with a DC offset. Conventionally, before a decision timing synchronization is accomplished to obtain proper decision timing, it was necessary to compensate for and thereby cancel an offset, e.g., by AFC (Automatic Frequency Control) or the like.

SUMMARY OF THE INVENTION

In this context, to solve the aforementioned problems, there is a need for a decision timing synchronous circuit and a receiver circuit which can recognize the optimum decision timing even in an environment with reduced noise as well as provide improved resistance to offsets while reducing the circuit scale.

To solve such problems, a decision timing synchronous circuit according to a first aspect of the present invention is characterized by including (1) logical operation means for performing a logical operation based on a binary signal of a received modulated signal supplied and a cyclic signal repeated regularly in a predetermined cycle; (2) serial-to-parallel conversion means for receiving an operational output from the logical operation means and for sampling the operational output with predetermined sampling timing within one inversion cycle of the cyclic signal and then delivering the sampled value as a parallel signal value; (3) correlation filter means having a plurality of digital filters for allowing each parallel signal value output from the serial-to-parallel conversion means to pass separately therethrough; (4) maximum difference detection means for detecting a maximum difference in a period of time during which a difference between the maximum value and the minimum value of each of the output signal values is equal to or greater than a threshold value, fundamentally within one inversion cycle of the cyclic signal, based on each output signal value having passed through each of the digital filters of the correlation filter means; (5) inversion timing detection means for determining a polarity of each of the output signal values having passed through each of the digital filters of the correlation filter means to detect polarity inversion timing; and (6) decision timing determination means for determining the timing detected by the inversion timing detection means as decision timing, when the maximum difference is detected by the maximum difference detection means.

A receiver circuit according to a second aspect of the present invention is characterized by including (1) binarization means for binarizing a received modulated signal supplied; (2) a decision timing synchronous circuit for determining decision timing based on the binary signal of the received modulated signal binarized by the binarization means; and (3) demodulation means for demodulating the binary signal of the received modulated signal from the binarization means using the decision timing determined by the decision timing synchronous circuit, wherein the decision timing synchronous circuit corresponds to the decision timing synchronous circuit according to the first aspect of the present invention.

According to the present invention, it is possible to recognize the optimum decision timing even in an environment with reduced noise, thereby allowing for providing improved resistance to offsets while reducing the circuit scale.

BRIEF DESCRIPTION OF THE DRAWINGS

FIG. 2 is a view illustrating the relation between an output signal from a signal detector and an output signal from a preamble signal generator according to the first embodiment;

FIG. 4 is a view illustrating the relation between an output signal from the signal detector and an output signal from the preamble signal generator according to the first embodiment;

FIG. 5 is explanatory view illustrating an output from an S/P converter according to the first embodiment;

FIG. 10 is a block diagram illustrating the internal configuration of a receiver circuit according to a third embodiment;

DETAILED DESCRIPTION OF THE INVENTION (A) First Embodiment

Now, a detailed description will be made to a decision timing synchronous circuit and a receiver circuit according to a first embodiment of the present invention with reference to the drawings.

In accordance with the embodiment, the description will be made to a receiver circuit which generates a demodulated signal from a detected signal received using the decision timing provided by the decision timing synchronous circuit of the present invention.

(A-1) Arrangement of the First Embodiment

Figure 1:
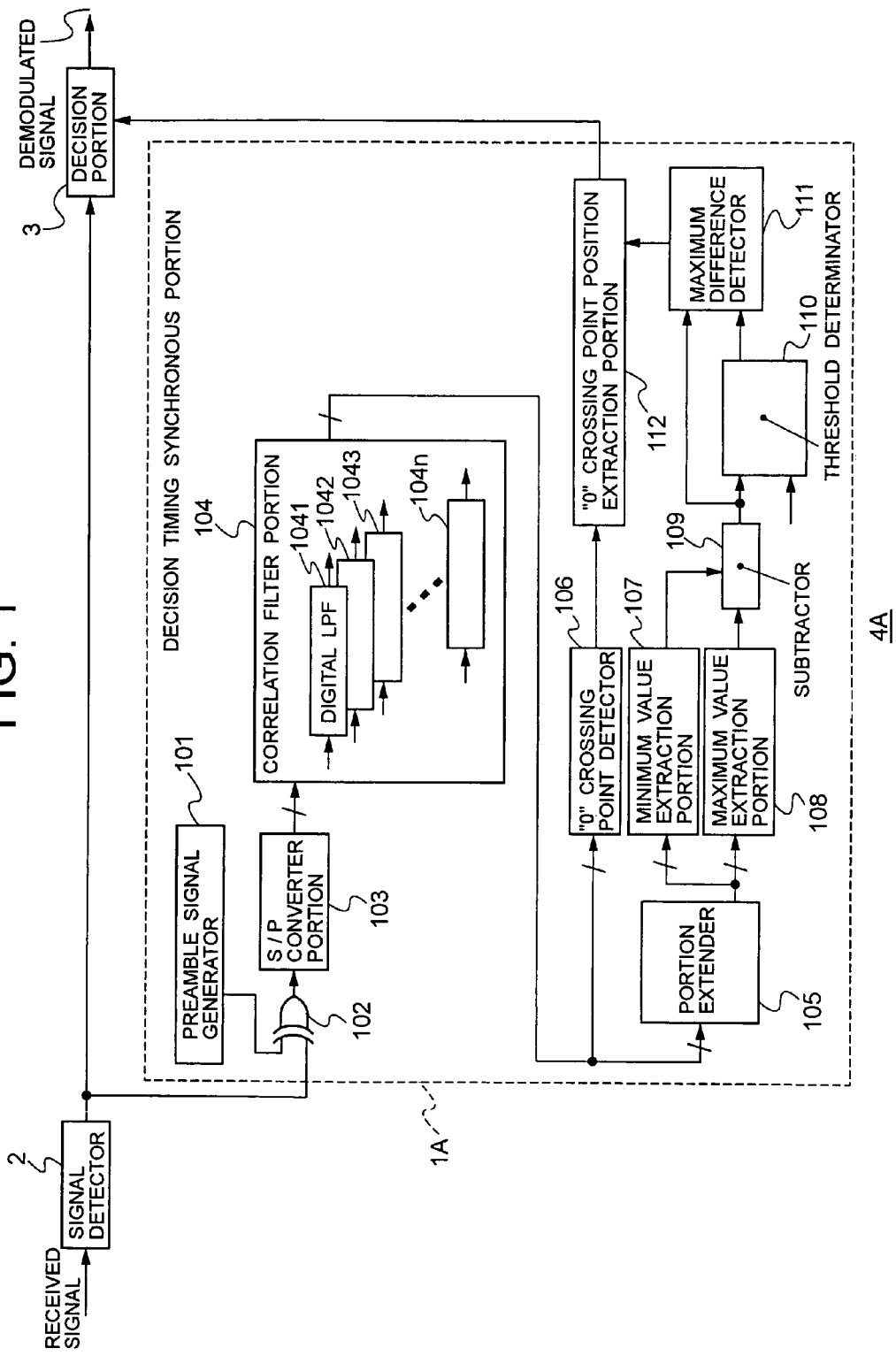
FIG. 1 is a block diagram illustrating the internal configuration of a receiver circuit according to a first embodiment of the present invention.

FIG. 1 is a block diagram illustrating the main internal configuration of the receiver circuit according to the embodiment. In FIG. 1, a receiver circuit 4A of the embodiment is configured to include a signal detector 2, a decision timing synchronous portion 1A, and a decision portion 3.

The signal detector 2 detects a received signal to provide a signal, which is binarized based on the detection result, to the decision timing synchronous portion 1A and the decision portion 3.

The decision timing synchronous portion 1A receives the detected signal provided by the signal detector 2 to extract a preamble signal component from the detected signal, thereby detecting decision timing. The decision timing synchronous portion 1A provides a detected decision timing to the decision portion 3.

The decision portion 3 determines the detected signal output from the signal detector 2 in accordance with the decision timing detected by the decision timing synchronous portion 1A to convert it to a demodulated signal. More specifically, the decision portion 3 employs the decision timing from the decision timing synchronous portion 1A as a reproduction clock signal to determine a synchronization word or data contained in the detected signal for output.

Additionally, in FIG. 1, the decision timing synchronous portion 1A includes at least a preamble signal generator 101, a logical operation device 102, an S/P (serial/parallel) converter portion 103, a correlation filter portion 104, a position extender 105, a "0" crossing point detector 106, a minimum value extraction portion 107, a maximum value extraction portion 108, a subtractor 109, a threshold determinator 110, a maximum difference detector 111, and a "0" crossing point position extractor 112.

The preamble signal generator 101 generates a cyclic signal (hereinafter also referred to as the preamble signal), which is repeated in a predetermined frequency cycle, to provide the cyclic signal generated to the logical operation device 102. The cyclic signal output from the preamble signal generator 101 is generated with respect to the free-running timing within the relevant receiver device. For this reason, the cyclic signal is not always matched in phase to the preamble pattern that is contained in the received signal.

The logical operation device 102 receives an output signal (serial signal) output from the signal detector 2 as well as receives a cyclic signal output from the preamble signal generator 101 to perform an operation corresponding to an exclusive OR (EXOR) based on the output signal from the signal detector 2 and the cyclic signal. The logical operation device 102 also provides an output or the operational result of the exclusive OR to the S/P converter portion 103. Note that the logical operation device 102 may also multiply the detected signal by the cyclic signal.

The S/P converter portion 103 receives the output signal (serial signal) from the logical operation device 102 to convert the output signal, which is a serial signal, into a parallel signal, and then provides the converted parallel signal to the correlation filter portion 104.

Here, the number of parallel signals converted by the S/P converter portion 103 corresponds to the number of sampling timings required to determine the decision timing in a preamble signal inversion cycle. That is, the S/P converter portion 103 performs sampling at a frequency n times higher than the symbol modulation rate of a received signal within a preamble inversion cycle (where n is an integer equal to two or greater), and outputs the sampled value as the value of a parallel signal.

FIG. 2 is a view illustrating the relation between the output signal from the signal detector 2 and the output signal from the preamble signal generator 101. As shown in FIG. 2, the S/P converter portion 103 is supplied with an output resulting from the exclusive OR between the output signal ((A) of FIG. 2) from the signal detector 2 and the output signal ((B) of FIG. 2) from the preamble signal generator 101 ((C) of FIG. 2).

The S/P converter portion 103 performs sampling in a cycle of a predetermined number of times of sampling (n times in this embodiment as shown in (D) of FIG. 2) within a preamble signal inversion cycle to output the result as a parallel signal. That is, provided is the output which is sampled at a frequency n times higher than the symbol modulation rate of the received signal supplied. For this reason, the parallel number of the parallel signals output from the S/P converter portion 103 is equal to the number of sampling times within the preamble signal inversion cycle.

Here, for example, as with the FSK and BPSK, in a preamble signal sequence where the amount of information per one symbol is one bit, e.g., an alternate repetition of "0" and "1" of { ..., 0, 1, 0, 1, 0, 1, ... }, the preamble signal inversion cycle has a one-symbol length. In another example, where "0" and "1" appear each successively twice in an alternately repeated manner, e.g., as in { ..., 0, 0, 1, 1, 0, 0, 1, 1, 0, 0, ... }, the preamble signal inversion cycle has a two-symbol length. Note that even a preamble with the amount of information per one symbol equal to or greater than two bits can also be handled in the same manner when the signal inversion cycle of a signal detector output is to repeat with respect to one symbol or more than one symbol.

The correlation filter portion 104 is a correlation filter for generating a correlation detection signal based on the respective values of each parallel signal output from the S/P converter portion 103.

As shown in FIG. 1, the correlation filter portion 104 has digital LPFs (low-pass filters) 1041 to 104n that correspond in number to the parallel signals. Each of the digital LPFs 1041 to 104n is connected to the S/P converter portion 103 to separately acquire and filter the respective parallel signal values output from the S/P converter portion 103.

Figure 3A:
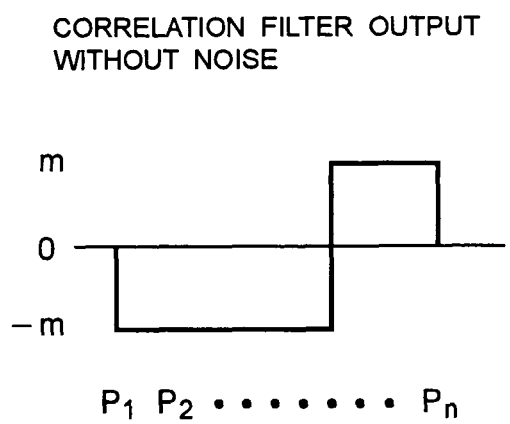
FIGS. 3A and 3B are views schematically illustrating signal sequences corresponding to sampling timing for detecting decision timing according to the first embodiment.
Figure 3B:
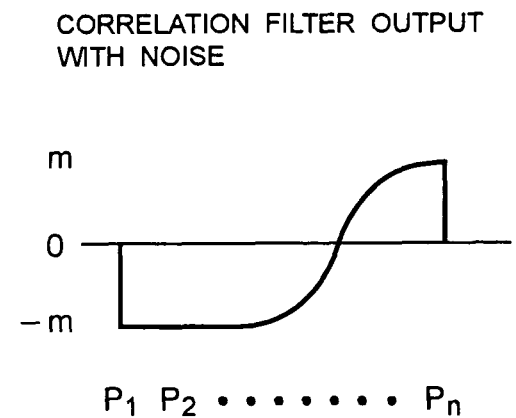

FIGS. 3A and 3B illustrate the output states that are formed based on the value of an output signal sequence output from each of the digital LPFs 1041 to 104n, i.e., a change in output value that is formed by arranging the parallel signal values output from the correlation filter portion 104.

FIG. 3A shows the output from the correlation filter portion 104 in the absence of noise, whereas FIG. 3B shows the output from the correlation filter portion 104 in the presence of noise.

The "0" crossing point detector 106 detects the sampling timing for passing through "0" indicating the time at which the polarity of a value is inverted between plus and minus, based on the output value from the correlation filter portion 104.

After having received each output signal value from the correlation filter portion 104, the position extender 105 then holds the output signal values (i.e., the sampled values obtained at sampling timings P1 to Pn).

The position extender 105 also adds output signal values, which are held for successive timings immediately before and after a preamble inversion cycle, to an output signal value in the preamble inversion cycle so as to extend the range indicated by the preamble inversion cycle. Note that the position extender 105 may extend the leading side, the trailing side, or both sides of a preamble inversion cycle.

This makes it possible to acquire a preamble signal component containing a sampled value (output signal value) immediately before and/or immediately after one-symbol length (one cycle of the preamble signal inversion cycle).

The minimum value extraction portion 107 acquires the values of an output signal sequence output from the position extender 105 to extract a correlation value (the minimum value) which indicates the minimum correlation between the values of the output signal sequence.

The maximum value extraction portion 108 acquires the values of an output signal sequence output from the position extender 105 to extract a correlation value (the maximum value) which indicates the maximum correlation between the values of the output signal sequence.

Note that the minimum value extraction portion 107 and the maximum value extraction portion 108 have a sharable operation and thus may be configured in one portion.

Here, the values of a signal sequence provided when the position extender 105 has extended the output range of the correlation filter portion 104 can be shown by the following expression using the output from the correlation filter portion 104.

$$P_{out} = \{-P_{in}(n-lp), -P_{in}(n-lp+1), \ldots, -P_{in}(n), P(1), P(2), \ldots, P(n-1), P(n), -P(n), -P(1), -P(2), \ldots, -P(ep-1), -P(ep)\} \quad (1),$$

where $P_{out}$; the values of the output signal sequence output from the position extender 105, $P_{in}(k)$; the value of a digital LPF output signal within a correlation filter corresponding to decision timing Pk, lp; the number of sequences to be extended on the leading side of the signal sequence of a correlation filter output, and ep; the number of sequences to be extended on the trailing side of the signal sequence of a correlation filter output.

As can be seen from above, the position extender 105 provides the sampled values (output signal values) extended before and after the values of a signal sequence {p(1), p(2), ..., P(n)} in the output range provided by the correlation filter portion 104.

The subtractor 109 receives the minimum value of an output signal sequence extracted by the minimum value extraction portion 107 and the maximum value of the output signal sequence extracted by the maximum value extraction portion 108 to derive the difference between the maximum value and the minimum value. On the other hand, the subtractor 109 provides the resulting difference between the maximum value and the minimum value to the threshold determinator 110 and the maximum difference detector 111.

The threshold determinator 110 receives the difference between the maximum value and the minimum value derived by the subtractor 109 to compare the difference between the maximum value and the minimum value with a predefined threshold value. If the difference between the maximum value and the minimum value is equal to or greater than the threshold value, then the threshold determinator 110 provides an output indicative of being equal to or greater than the desired value to the maximum difference detector 111. Here, the difference between the maximum value and the minimum value being equal to or greater than the threshold value is to be considered as a preamble reception in the embodiment.

Note that the predefined threshold value is desirably set to a smaller value to some extent in consideration of noise. When a good received signal with reduced noise is provided, this makes it possible to send successively an output indicative of being greater than the threshold value across a plurality of symbols.

The maximum difference detector 111 receives the output indicative of being equal to or greater than the threshold value successively from the threshold determinator 110. Meanwhile, the maximum difference detector 111 receives a signal indicating the difference between the maximum value and the minimum value from the subtractor 109 and sequentially compares the previous sampling timing difference with the current sampling timing difference, thereby detecting the sampling timing that provides the maximum difference.

This makes it possible to identify the symbol at the point in time at which the subtractor 109 provides the maximum output in the successively occurring preamble reception periods. The point in time at which the maximum output is provided can be also said to be the time of the maximum correlation with the preamble pattern.

The "0" crossing point position extraction portion 112 receives the sampling timing that passes through "0" detected by the "0" crossing point detector 106 and receives the sampling timing indicating the maximum difference detected by the maximum difference detector 111, thus holding the sampling timing that passes through "0" indicating the inversion of a signal value polarity.

The output from the maximum difference detector 111 can be said to be a signal which updates the sampling timing of the output from the "0" crossing point position extraction portion each time the signal output from the subtractor 109 increases after the initiation of the indication of a preamble reception.

The decision portion 3 receives an output signal from the "0" crossing point position extraction portion 112 and adds thereto a timing difference from the optimum sampling timing for demodulating the output signal to a value indicating the sampling timing that passes through "0." In accordance with the sampling timing having the resulting value, the decision portion 3 assesses the detected signal from the signal detector 2 to provide a demodulated signal for output.

(A-2) Operation of the First Embodiment

Now, a description will be made to the operation of the decision timing circuit according to the embodiment with reference to the drawings.

The binarized signal detected by the signal detector 2 is provided to a decision timing synchronous portion 1A and the decision portion 3.

In FIG. 1, when the detected signal from the signal detector 2 is provided to the decision timing synchronous portion 1A, the detected signal is provided to the logical operation portion 102. Then, in the logical operation portion 102, the detected signal is exclusive ORed with a cyclic signal from the preamble signal generator 101, and the resulting output is provided to the S/P converter portion 103.

The S/P converter portion 103 converts the output into parallel signals that are equivalent in number to the number of times of sampling for detecting decision timing within a preamble signal inversion cycle, and the value of each parallel signal is delivered to the correlation filter portion 104.

The correlation filter portion 104 has the digital LPFs 1041 to 104n corresponding in number to the number of the parallel signals. The value of each parallel signal is provided to each of the digital LPFs 1041 to 104n, respectively, and delivered as a correlation detection signal to the position extender 105 and the "0" crossing point detector 106.

Note that even when an offset is present in an output from the signal detector 2, the offset is cancelled through the correlation filter portion 104 of the embodiment, thereby suppressing the effect of the offset. This will be described with reference to FIGS. 4 and 5.

In FIG. 4, suppose that an offset is contained in a received signal which includes a preamble signal component. In this case, even in the presence of an extremely reduced effect of noise, the signal detector output will be such that the output intervals of "0" and "1" are not the same but either one of them occupies more time (see (A) of FIG. 4). Note that in the case of an ideal received signal with neither any noise nor any offset, the "0" and "1" output intervals have the same duty ratio of 50%.

In this case, the "1" and "0" intervals of an input to the S/P converter 103 will vary depending whether the output signal from the preamble signal generator 101 is "0" or "1" (see (B) and (C) of FIG. 4).

On the other hand, the different input intervals of "1" and "0" causes the output intervals of the S/P converter 103 to differ as shown in FIG. 5.

FIG. 5(A) shows a signal output from the S/P converter 103 when the output signal from the preamble generator 101 in (B) of FIG. 4 is "0." In this case, the position of a "0" crossing point in the absence of offset is shifted by the amount of the offset (see FIG. 5(C)), resulting in a certain amount of change in the output interval ratio between "1" and "0."

On the other hand, FIG. 5(B) shows a signal output from the S/P converter 103 when the output signal from the preamble generator 101 in (B) of FIG. 4 is "1." In this case, the position of a "0" crossing point in the absence of offset is shifted in the direction opposite to that of FIG. 5(A) by the amount of the offset (see FIG. 5(C)), resulting in a certain amount of change in the output interval ratio between "1" and "0."

Although being subjected to the effects of noise in practice, the input is averaged by the correlation filter portion 104 and a certain amount of change, caused by offset, in the output from the correlation filter portion 104 is cancelled out, thereby making it possible to suppress the effects of offset.

Assuming that "b" is the number of preamble symbols and "n" is the number of times of oversampling per one symbol, the number of shift register stages needs conventionally to be $(b-1) \times (n+1)$ or more, resulting in a tremendous increase in the scale of the circuit. However, in the embodiment, when formed of IIR filters, the registers may be n in number, and thus the circuit can be reduced in scale. This allows for providing improved resistance to offsets while making the circuit scale smaller than before.

Referring back to FIG. 1, when the output from the correlation filter portion 104 is provided to the "0" crossing point detector 106, the "0" crossing point detector 106 detects the "0" crossing point at which the plus and minus polarities are inverted.

Figure 6:
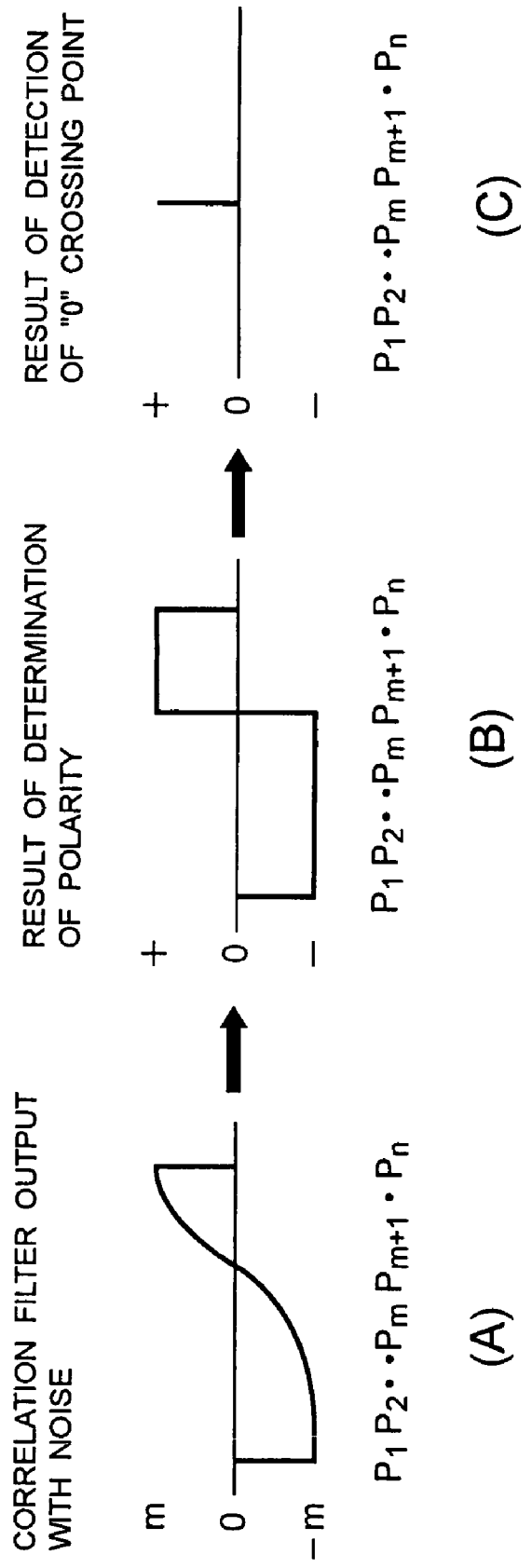
FIG. 6 is an explanatory view illustrating a process for detecting a "0" crossing point according to the first embodiment.

Here, as shown in FIG. 6, a method of detecting the "0" crossing point using the "0" crossing point detector 106 is performed as follows. That is, first, the polarity of a correlation filter output which is input to the "0" crossing point detector 106 is determined to obtain the polarity result at each of the sampling timings P1 to Pn ((A) and (B) of FIG. 6). Then, the polarities at successive sampling timings Pm and Pm+1 are compared with each other to flag the sampling timing Pm when the polarities differ from each other. This makes it possible to detect the position of the sampling timing Pm as the "0" crossing point. As for the sampling timing Pn, the same comparison is made between the sampling timing Pn and the sampling timing P1 at which the polarity is inverted.

Additionally, when the output from the correlation filter portion 104 is provided to the position extender 105, the position extender 105 extends the number of parallel signals output from the correlation filter portion 104 to a number equal to or greater than one preamble signal inversion cycle. The position extender 105 extends the range in which the maximum value and the minimum value of correlation values are detected to one or more symbol lengths of a preamble signal.

Then, the values of the signal sequence extended by the position extender 105 are supplied to the minimum value extraction portion 107 and the maximum value extraction portion 108, so that the minimum value extraction portion 107 and the maximum value extraction portion 108 determine the minimum value and the maximum value.

Figure 7:
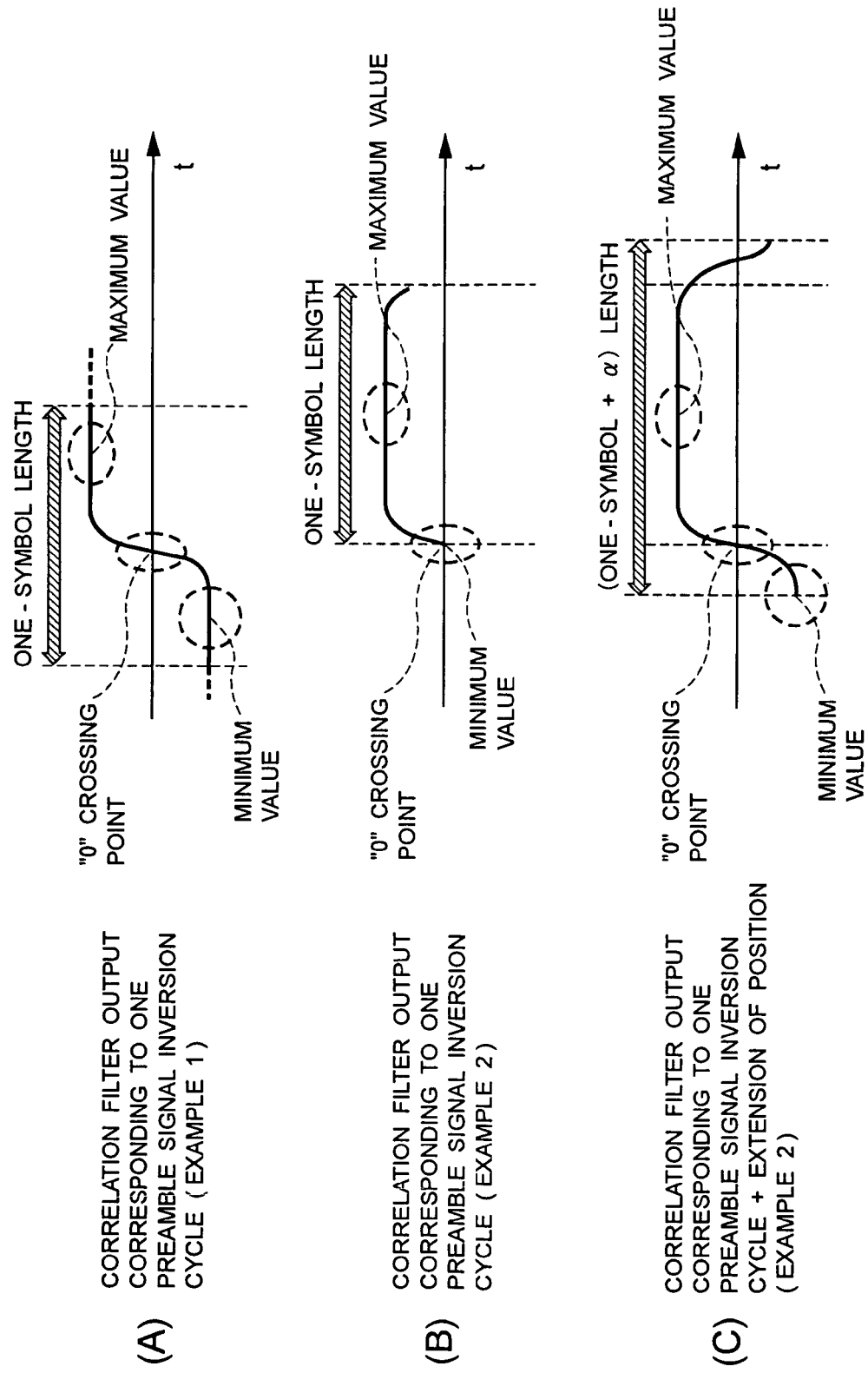
FIG. 7 is an explanatory view illustrating how a position is extended according to the first embodiment.

FIG. 7 is a view illustrating the relation between the signal sequence extended by the position extender 105 and the minimum and maximum values thereof.

In (A) of FIG. 7, the signal sequence (one-symbol length) output from the correlation filter portion 104 has the "0" crossing point (where the polarity of a correlation value is inverted from minus to plus) approximately in the vicinity of the center of the signal sequence. Accordingly, in this case, it is possible to obtain the proper minimum and maximum correlation values from the output signal sequence provided by the correlation filter portion 104.

On the other hand, in (B) of FIG. 7, the "0" crossing point appears near the head position of the output signal sequence from the correlation filter portion 104. Accordingly, in this case, the correlation value at the "0" crossing point, i.e., "0" is the minimum correlation value, and it is thus not possible to obtain a proper minimum value.

Thus, in this embodiment, the position extender 105 extends the output signal sequence as shown in (C) of FIG. 7, thereby allowing for detecting proper minimum and maximum values in an output signal sequence having a time width of a preamble signal inversion cycle (one-symbol length)+a.

When the minimum value extraction portion 107 and the maximum value extraction portion 108 extract the minimum value and the maximum value, the subtractor 109 determines the difference between the maximum value and the minimum value, and the difference is supplied to the threshold determinator 110.

In the threshold determinator 110, only when the difference between the maximum value and the minimum value is equal to or greater than the threshold value, an output indicative of being equal to or greater than the threshold value (i.e., an output indicating the reception of a preamble signal) is provided to the maximum difference detector 111.

When provided by the threshold determinator 110 with the output indicative of being equal to or greater than the threshold value, the maximum difference detector 111 is supplied with the difference between the maximum value and the minimum value from the subtractor 109. The position, at which the difference between the maximum value and the minimum value is maximized, is detected while being successively provided with the output indicative of being equal to or greater than the threshold value.

When the maximum difference detector 111 has detected the maximum difference, the sampling timing is provided to the "0" crossing point position extraction portion 112. The "0" crossing point position extraction portion 112 is also provided with the "0" crossing point sampling timing detected by the "0" crossing point detection portion 106 and holds the sampling timing that passes through "0."

Then, the decision portion 3 receives an output signal from the "0" crossing point position extraction portion 112 and adds thereto a timing difference from the optimum sampling timing for demodulating the output signal to a value indicating the sampling timing that passes through "0." In accordance with the sampling timing having the resulting value, the decision portion 3 determines the detected signal from the signal detector 2 to provide a demodulated signal for output.

(A-3) Effects of the First Embodiment

As described above, according to the embodiment, the correlation filter portion 104 has the digital LPFs 1041 to 104n connected respectively to the S/P converter 103, thereby allowing for making the circuit scale smaller than before.

Additionally, according to the embodiment, the timing for which the difference between the maximum value and the minimum value of correlation filter outputs is maximized is employed as decision timing, thereby making it possible to find the optimum decision timing even for a received signal, e.g., in an environment with reduced noise.

Furthermore, according to the embodiment, the correlation filter portion 104 averages inputs in the entire sampling timing range, thereby allowing for canceling out a certain amount of variations caused by offset and thus suppressing the effects of offset.

(B) Second Embodiment

Now, a description will be made to a decision timing synchronous circuit and a receiver circuit according to a second embodiment of the present invention with reference to the drawings.

Figure 8:
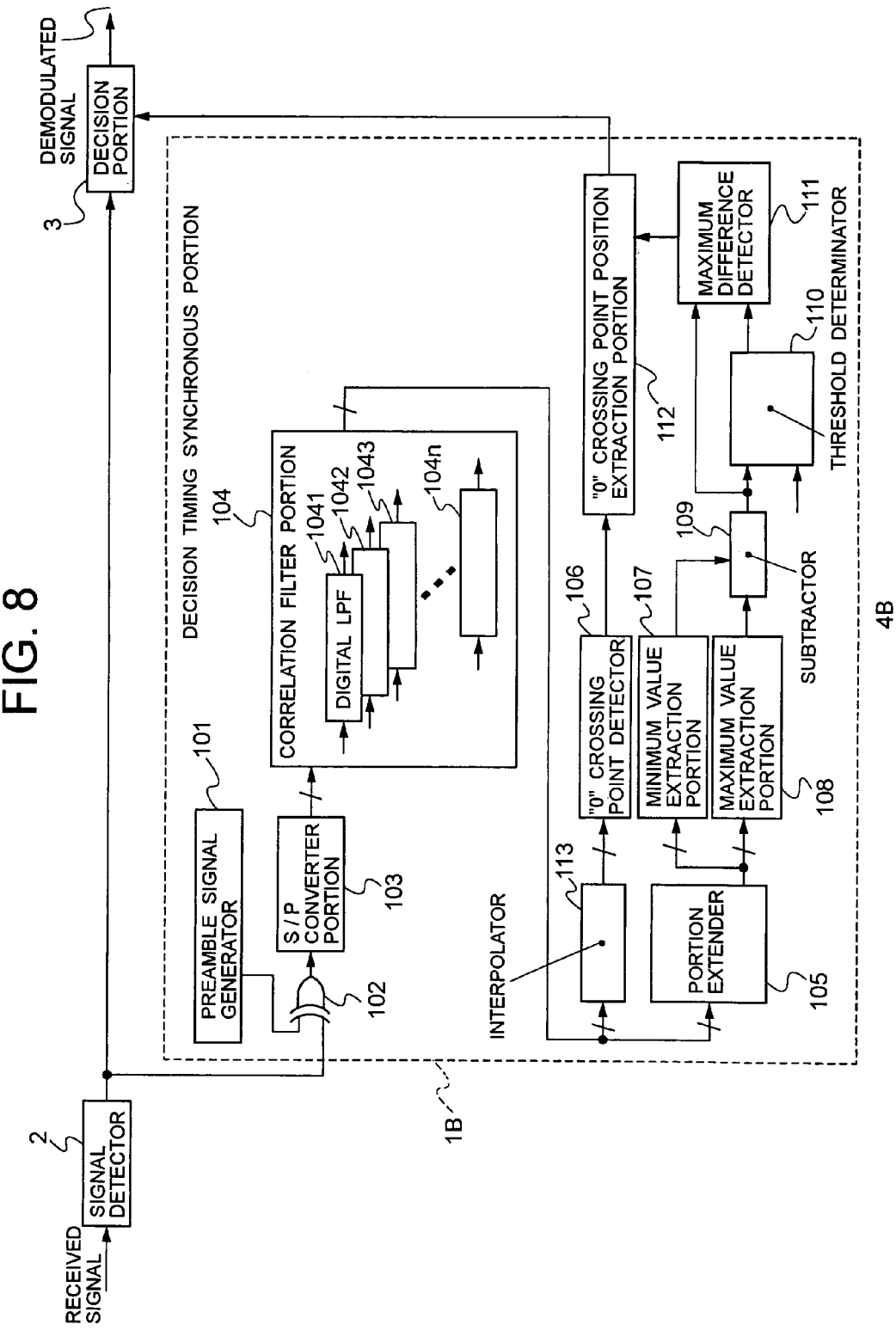
FIG. 8 is a block diagram illustrating the internal configuration of a receiver circuit according to a second embodiment.

FIG. 8 is a block diagram illustrating the main internal configuration of a receiver circuit 4B according to the second embodiment.

The arrangement of the second embodiment is different from the arrangement of the first embodiment in that a decision timing synchronous portion 1B of the second embodiment includes an interpolator 113 for interpolating the values between the sampling timings output from the correlation filter portion 104.

Since the other components correspond to those of the first embodiment, FIG. 8 shows the components with the symbols corresponding to those of FIG. 1. Furthermore, the detailed description below relates to the interpolator 113 which is characteristic to the second embodiment, and thus the other components, which have already been explained in relation to the first embodiment, will not be detailed any further.

The interpolator 113 receives the values of an output signal sequence from each of the digital LPFs 1041 to 104n included in the correlation filter portion 104, provides an interpolating value between each output signal, and provides the interpolated value of the signal sequence to the "0" crossing point detector 106.

Here, as described in relation to the first embodiment, the number of signal sequences output from each of the digital LPFs 1041 to 104n of the correlation filter portion 104 is the number of parallel signals output from the S/P converter 103. Moreover, the number of parallel signals is the number of sampling timings for detecting decision timing within a preamble signal inversion cycle.

In this context, the interpolator 113 of the embodiment interpolates a value between output signals from each of the digital LPFs 1041 to 104n, i.e., between sampling timings.

This allows for making the decision timing resolution required for decision timing synchronization higher than the resolution determined by the number of parallel signals output from the S/P converter 103.

In general, to make a decision timing resolution higher than the number of parallel signals from the S/P converter 103, it is contemplated that the number of digital LPFs included in the correlation filter portion 104 should be increased.

However, as with the embodiment, the interpolator 113 can be included between the correlation filter portion 104 and the "0" crossing point detector 106 allowing the interpolator 113 to interpolate values. This makes it possible to find decision timing with an increased resolution without increasing the number of digital LPFs.

Figure 9A:
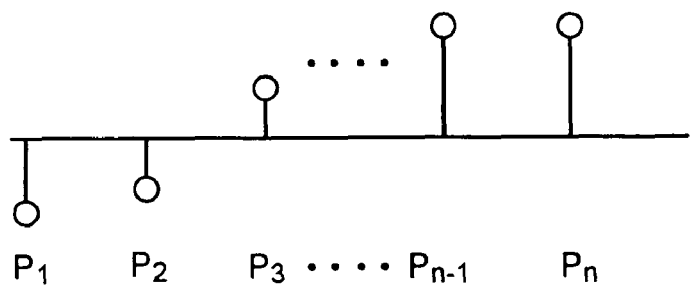
FIGS. 9A and 9B are explanatory views for illustrating an interpolation process according to the second embodiment.
Figure 9B:
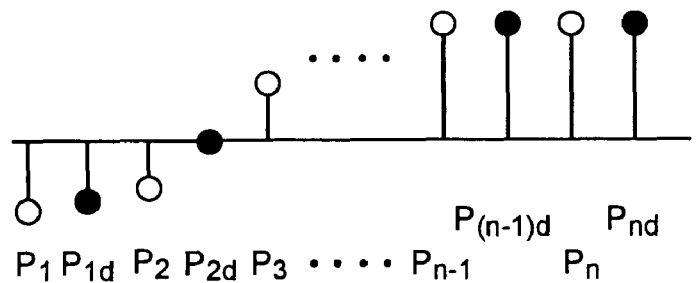

FIGS. 9A and 9B schematically illustrate an interpolation performed by the interpolator 113. FIG. 9A shows the values (open circles) of an output signal sequence from the correlation filter portion 104, while FIG. 9B shows the values (black circles) of interpolated signals including those interpolated by the interpolator 113.

Additionally, various methods can be employed without limitation as the method for interpolation of values by the interpolator 113. For example, such a method can be contemplated that the interpolator 113 interpolates an intermediate value, which is based on two successive output signal values from the correlation filter portion 104, in between the output signals from the correlation filter portion 104 (i.e., at the midpoint of the sampling timing interval).

In determining the intermediate value, the interpolator 113 may also provide an intermediate value obtained by weighting any output signal value (a weighted average value) for interpolation. On the other hand, although FIG. 9B shows a case where one value is interpolated between two output signal values, two or more values may also be interpolated therebetween.

As described above, the second embodiment can provide the same effects as those of the first embodiment.

Additionally, according to the second embodiment, the interpolator 113 is included between the correlation filter portion 104 and the "0" crossing point detector 106, thereby making it possible to provide an increased resolution required for a decision timing synchronization without increasing the number of the digital LPFs 1041 to 104n in the correlation filter portion 104. As a result, it is possible to find highly optimized decision timing.

(C) Third Embodiment

Now, a description will be made to a decision timing synchronous circuit and a receiver circuit according to a third embodiment of the present invention with reference to the drawings.

FIG. 10 is a block diagram illustrating the main internal configuration of a receiver circuit 4C according to the third embodiment.

The third embodiment is different from the first embodiment in that a decision timing synchronous portion 1C of the third embodiment includes a mode change switch 114, a decimator 115, and a window converter 116 between the S/P converter portion 103 and the correlation filter portion 104.

Since the other components correspond to those of the first embodiment, FIG. 10 shows the components with the symbols corresponding to those of FIG. 1. Furthermore, the description below relates to the arrangement that is characteristic to the third embodiment, and thus the other components, which have already been described in relation to the first embodiment, will not be detailed any further.

The mode change switch 114 receives a control signal from a control portion (not shown) to switch the sampling timing interval required for determining decision timing in accordance with the control signal.

In the embodiment, multiple modes of operation with different sampling timings are prepared, so that the mode change switch 114 switches between the modes of operation in accordance with a control signal from the control portion (not shown).

These modes of operation include an operational mode for performing correlation with the number of sampling timings which is less than the number of sampling timings for determining decision timing within a preamble signal inversion cycle (hereinafter, this mode is referred to as the coarse quantization). Also included is an operational mode for performing correlation with the number of sampling timings which is equal to or greater than the number of sampling timings for determining decision timing within a preamble signal inversion cycle during a particular partial period of the preamble signal inversion cycle (hereinafter, this mode is referred to as the fine quantization).

The mode change switch 114 instructs the decimator 115 to operate to perform the coarse quantization mode of operation whereas instructing the window converter 116 to operate to perform the fine quantization mode of operation.

When instructed by the mode change switch 114 in the coarse quantization mode of operation, the decimator 115 decimates a certain number of parallel signals from the parallel signals from the S/P converter 103 within a preamble signal inversion cycle such that the parallel signals are provided at equal intervals. The decimator 115 also provides the values of the remaining parallel signals after the decimation to the correlation filter portion 104.

Figure 11:
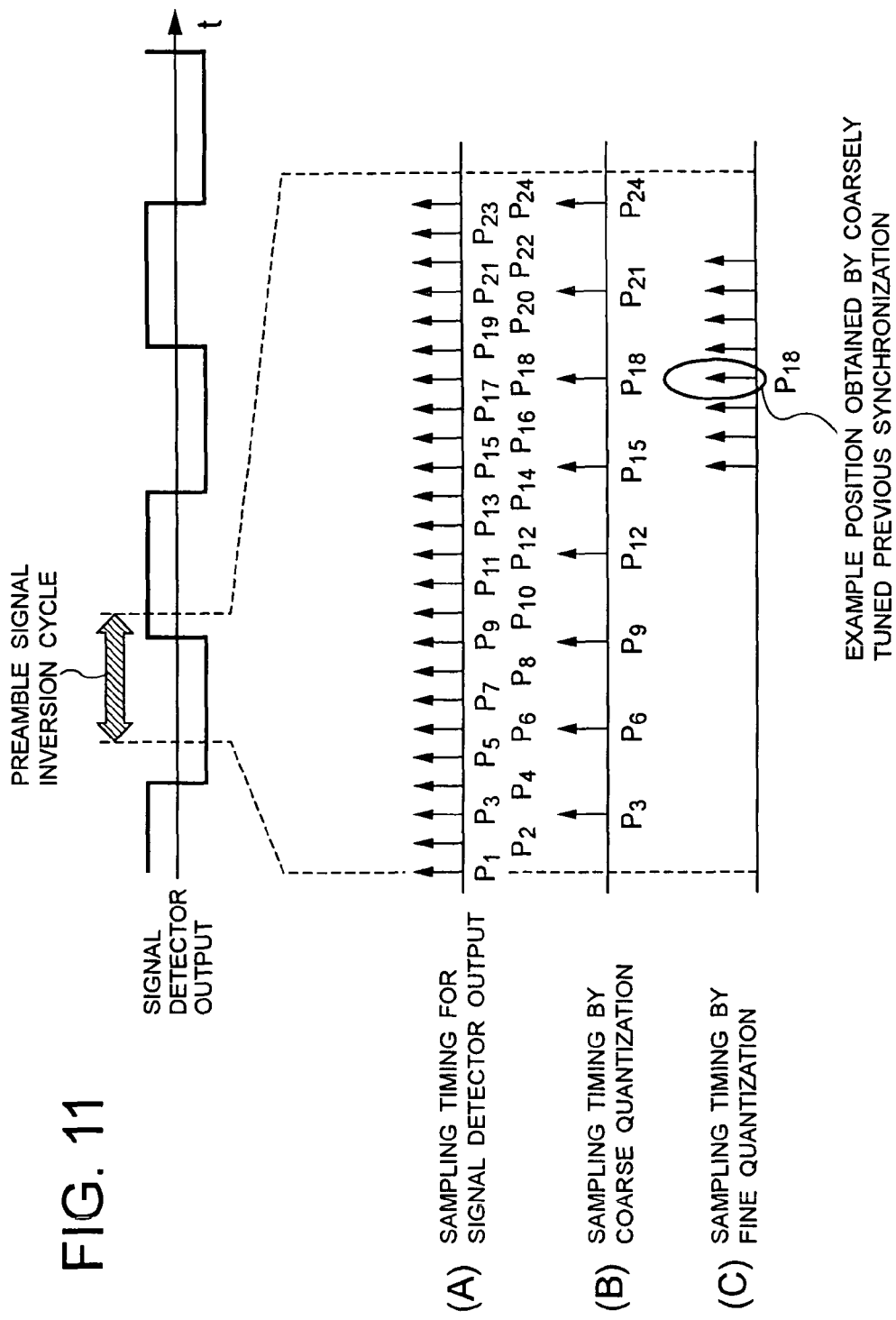
FIG. 11 is an explanatory view illustrating coarse quantization and fine quantization processes according to the third embodiment.

FIG. 11 schematically shows the processing by the decimator 115 and the window converter 116, (B) of FIG. 11 illustrating the decimation of parallel signals by the decimator 115.

As shown in (B) of FIG. 11, the decimator 115 extracts parallel signals at intervals of three parallel signals within a preamble signal inversion cycle output from the S/P converter 103 so as to decimate the other parallel signals and output the values of the remaining parallel signals. For example, for the sampling timing as shown in (A) of FIG. 11, the sampling timings P3, P6, P9, . . . are extracted. In this manner, those parallel signals corresponding in number to the number of predetermined equidistant sampling timings within the preamble signal inversion cycle are extracted to output their signal values.

When instructed by the mode change switch 114 in the fine quantization mode of operation, the window converter 116 operates with sampling timing equal to or greater than the sampling timing for determining decision timing during a partial period around a particular sampling timing position within a preamble signal inversion cycle.

(C) of FIG. 11 schematically shows the processing by the window converter 116, which is performed to bring sampling timing back to the sampling timing for determining decision timing during a predetermined period around the particular sampling timing (the sampling timing P18 in (C) of FIG. 11) which is instructed by the mode change switch 114.

Note that, for example, a position (or timing) obtained through a previous decision timing synchronization (coarsely tuned synchronization) can be used as the central sampling timing. A partial period can also be predefined, e.g., it is possible to define, as the partial period, the three leading sampling timings and the four trailing sampling timings with respect to the central sampling timing.

As described above, the third embodiment can provide the same effects as those of the first embodiment.

Furthermore, according to the third embodiment, approximate decision timing can be extracted in advance with a coarse quantization accuracy in the entire range of a preamble signal inversion cycle, and thereafter decision timing can be partially extracted with a fine quantization accuracy. This makes it possible to find the decision timing in an increased resolution without increasing the number of digital LPFs that the correlation filter portion 104 has to include. It is also possible to reduce the load on the processing by the decision timing synchronous portion 1C.

(D) Fourth Embodiment

Now, a description will be made to a decision timing synchronous circuit and a receiver circuit according to a fourth embodiment of the present invention with reference to the drawings.

The aforementioned first to third embodiments show such a case where the sampling timing with which the correlation value with a preamble pattern is maximized is determined as decision timing.

In contrast to this, the fourth embodiment allows for detecting a unique word (UW) at the time at which a preamble pattern was properly received, in addition to the correlation value with the preamble pattern, and then determining the sampling timing obtained by the detection as the decision timing.

Figure 12:
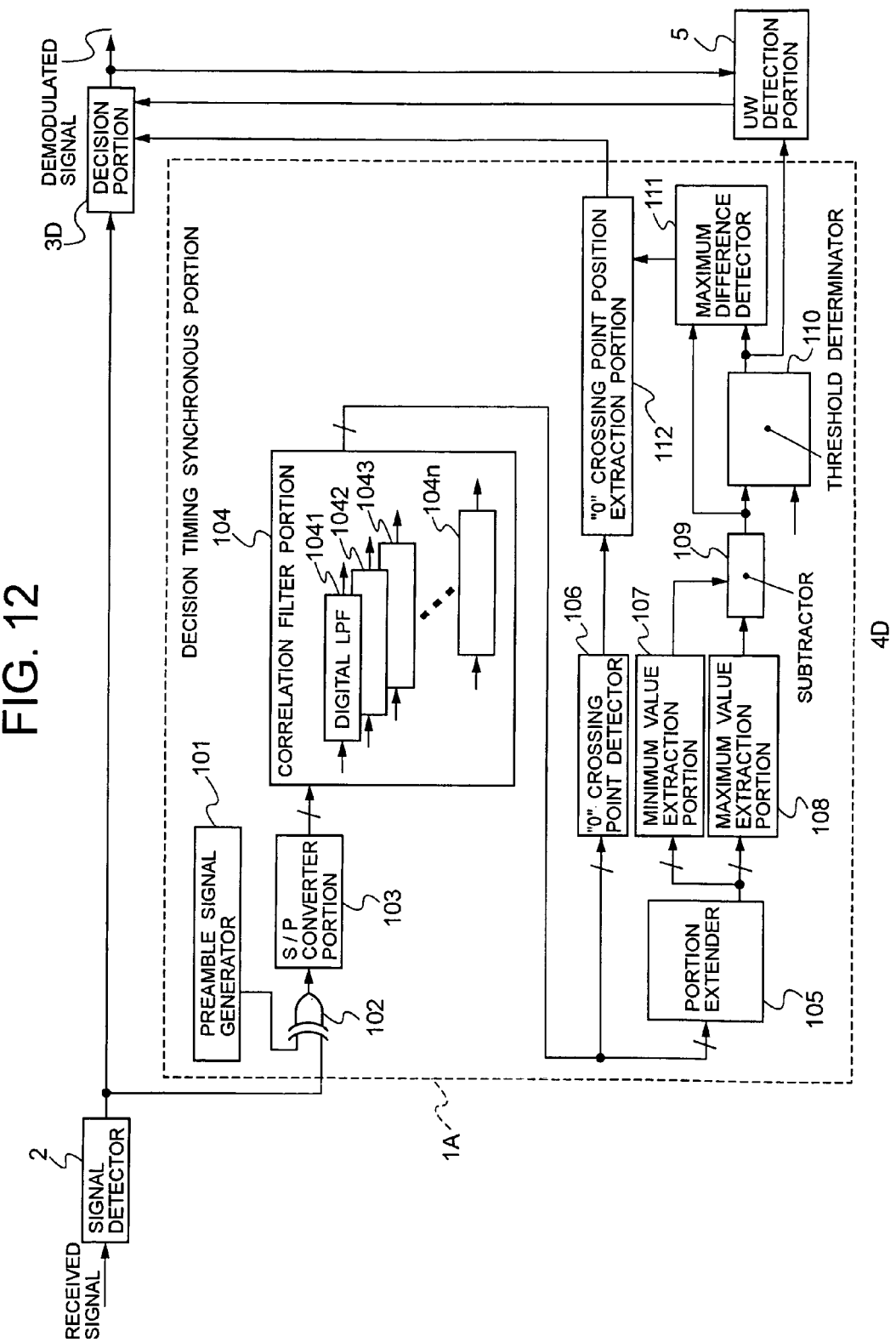
FIG. 12 is a block diagram illustrating the internal configuration of a receiver circuit according to a fourth embodiment.

FIG. 12 is a block diagram illustrating the main internal configuration of a receiver circuit 4D according to the fourth embodiment. As shown in FIG. 12, the receiver circuit 4D of the fourth embodiment is configured to include the signal detector 2, the decision timing synchronous portion 1A, the decision portion 3D, and a UW detection portion 5.

Note that FIG. 12 shows the decision timing synchronous portion of the first embodiment; however, the invention is not limited thereto, and the decision timing synchronous portions 1B and 1C of the second and third embodiments can also be employed.

Additionally, FIG. 12 employs the symbols corresponding to those of FIG. 1 to show the components that correspond to those already described in relation to the first embodiment. Furthermore, the detailed description below relates to the UW detection portion 5 and the decision portion 3D which are characteristic to the fourth embodiment, and thus the other components, which have already been explained in relation to the first embodiment, will not be detailed any further.

The UW detection portion 5 accepts, from the threshold value decision portion 110, an output which indicates that the difference between the maximum value and the minimum value of the correlation values with a preamble signal is equal to or greater than a threshold value, and employs the output as a starting condition.

The UW detection portion 5 also receives a demodulated signal provided by the decision portion 3D to compare the demodulated signal with a signal sequence corresponding to a predefined unique word. If they match with each other, the UW detection portion 5 detects the incoming of a received frame (or a received packet) and the head of the received frame. When having detected a match with the signal sequence corresponding to a unique word provided in advance, the UW detection portion 5 also provides the detected timing to the decision portion 3D.

As with the first embodiment, the decision portion 3D demodulates a detected signal in accordance with an output from the decision timing synchronous portion 1A. The decision portion 3D also provides the resulting demodulated signal to the UW detection portion 5.

Furthermore, the decision portion 3D holds output signals, corresponding to the number of symbols of a unique word, output from the "0" crossing point position detect portion 112. The decision portion 3D then receives timing from the UW detection portion 5 as the unique word is detected. The decision portion 3D thus determines, as the decision timing, the position of an output signal of those being held which precedes the position of an output signal corresponding to the timing by the number of symbols of the unique word, and then performs demodulation.

Figure 13:
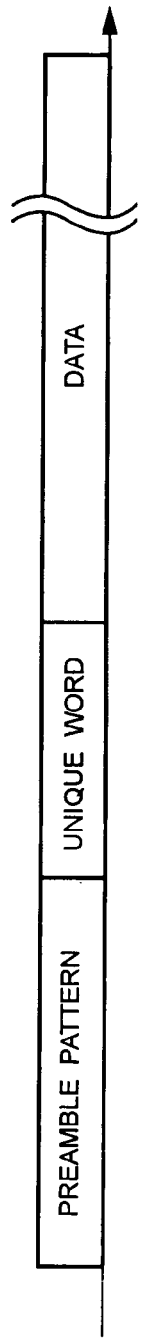
FIG. 13 is an explanatory view illustrating a frame structure according to the fourth embodiment.

FIG. 13 shows the structure of a frame or packet sent by a transmitting side. As shown in FIG. 13, the frame is configured to have first a preamble pattern, then a unique word, and finally data.

In general, a decision timing synchronization method determines decision timing based on a correlation with a preamble pattern; however, this embodiment is adapted to determine decision timing in consideration of the matching with a unique word.

For example, it is contemplated that other information or non-transmission period may be included between the preamble pattern and the unique word. In this case, taking the period of the other information or the non-transmission into account, the UW detection portion 5 and the decision portion 3D will not check for the matching with the unique word during this period but check for the matching with the unique word after the above period has elapsed. This makes it similarly possible to accommodate a frame that is not configured as shown in FIG. 13.

As described above, the fourth embodiment can provide the same effects as those of the first embodiment.

According to the fourth embodiment, use of the detection timing of a unique word makes it also possible to determine decision timing based on not only the magnitude of a correlation value with a preamble pattern but also the timing found with accuracy in the actual presence of the preamble pattern. This allows for obtaining decision timing with further improved reliability.

(E) Fifth Embodiment

Now, a description will be made to a decision timing synchronous circuit and a receiver circuit according to a fifth embodiment of the present invention with reference to the drawings.

The fifth embodiment relates to a method for detecting a "0" crossing point by the "0" crossing point detector 106.

Accordingly, the method to be described in the fifth embodiment is applicable to all the "0" crossing point detectors 106 that have been described in the aforementioned first to fourth embodiments.

Figure 14:
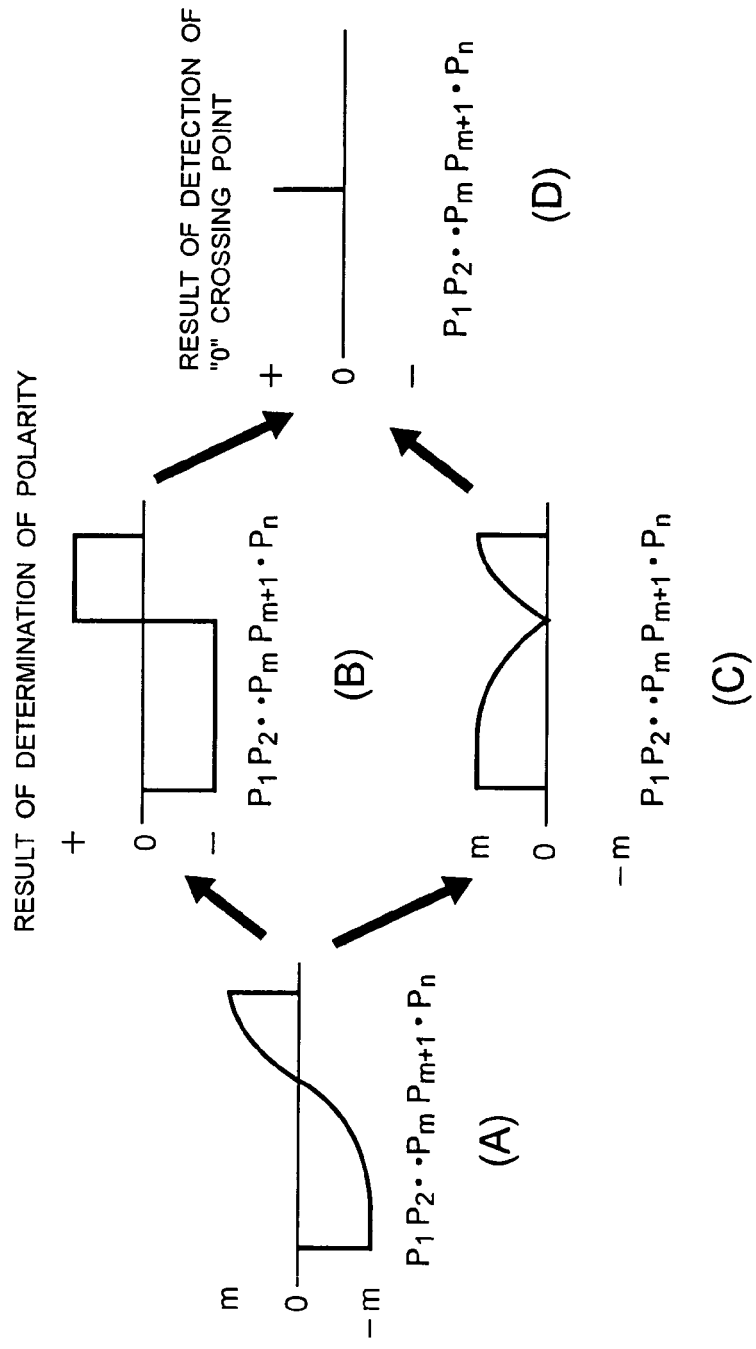
FIG. 14 is an explanatory view illustrating a process for detecting a "0" crossing point according to a fifth embodiment.

FIG. 14 schematically shows the process of detecting the "0" crossing point by the "0" crossing point detector 106 according to the fifth embodiment.

To begin with, upon reception of an output signal sequence from the correlation filter portion 104 ((A) of FIG. 14), the "0" crossing point detector 106 determines the polarity of each output signal to obtain a polarity result corresponding to sampling timings P1 to Pn ((B) of FIG. 14).

Thereafter, the "0" crossing point detector 106 determines the absolute value of an output from the correlation filter portion 104 ((C) of FIG. 14).

Then, the "0" crossing point detector 106 compares the polarities of the sampling timings Pm and Pm+1 with each other. If the polarities differ from each other, the absolute values corresponding to the sampling timings Pm and Pm+1 are compared with each other and the sample timing having the smaller absolute value is flagged ((D) of FIG. 14).

As for Pn, the same comparison is made between Pn and P1 having an inverted polarity.

In the embodiment, the "0" crossing point detector 106 was described to take the absolute value of an output polarity; however, for example, if a point of change in polarity with successive sampling timings can be recognized, the polarity may also be squared to detect the "0" crossing point.

(F) Other Embodiments

The "0" crossing point detector 106 according to the aforementioned first to fifth embodiments may also process, as the "0" crossing point, an intermediate point between the maximum value and the minimum value of the output signal values output from each of the digital LPFs 1041 to 104n.

The "0" crossing point detector 106 according to the aforementioned first to fifth embodiments may also determine the polarity of each output signal value obtained separately from the digital LPFs 1041 to 104n corresponding to sampling timing to find those having different polarities with adjacent sampling timings. The "0" crossing point detector 106 may then select either one of the sampling timing at the leading temporal position or the sampling timing at the trailing temporal position.

The "0" crossing point detector 106 according to the aforementioned first to fifth embodiments may also employ, as the "0" point, an intermediate value between the maximum and minimum values that the digital filters can take. Then, employed are the sampling timings at temporal end positions of those relevant to a cycle, in which the value of a preamble signal produced with unique timing on the receiving side changes, to invert the polarity of the opposite end with respect to the intermediate value. The "0" crossing point detector 106 may then determine the polarities of those two values, and if the polarities differ from each other, may select the sampling timing either at the leading temporal position or at the trailing temporal position.

The "0" crossing point detector 106 according to the aforementioned first to fifth embodiments may also employ, as the "0" point, an intermediate value between the maximum value and the minimum value that the digital LPFs 1041 to 104n can take. Then, the polarity and absolute value of the value of each signal obtained separately from the digital filters corresponding to sampling timing are determined to find those having different polarities at adjacent sampling timings. Then, the absolute values of digital filter outputs relevant to those two sampling timings are compared with each other to select the sampling timing at which the absolute value is smaller.

The "0" crossing point detector 106 according to the aforementioned first to fifth embodiments may also employ, as the "0" point, an intermediate value between the maximum and minimum values that the digital filters can take. Then, employed are the sampling timings at temporal end positions of those relevant to a cycle, in which the value of a preamble signal produced with unique timing on the receiving side changes, to invert the polarity of the opposite end with respect to the intermediate value. The "0" crossing point detector 106 may then determine the polarities and absolute values of those two values and find those having different polarities at adjacent sampling timings. Then, the absolute values of digital filter outputs relevant to those two sampling timings are compared with each other to select the sampling timing at which the absolute value is smaller.

While the invention has been described above with reference to the preferred embodiments thereof, it is to be understood by those skilled in the art that various modifications and variations may be made thereto, and the appended claims are intended to cover all such modifications and variations as fall within the scope of the invention. The present application is based on Japanese Patent Application No. 2005-378414, the contents of which are incorporated herein by reference.

What is claimed is:

1. A decision timing synchronous circuit comprising:
    logical operation means for performing a logical operation based on a binary signal of a received modulated signal and a cyclic signal repeated regularly in a predetermined cycle;
    serial-to-parallel conversion means for receiving an operational output from the logical operation means and for sampling the operational output with predetermined sampling timing within one inversion cycle of the cyclic signal and then delivering the sampled value as a parallel signal value;
    correlation filter means having a plurality of digital filters providing output signal values for allowing each parallel signal value output from the serial-to-parallel conversion means to pass separately therethrough;
    maximum difference detection means for detecting a maximum difference in a period of timing during which a difference between a maximum value and a minimum value of each of the output signal values is equal to or greater than a threshold value, within one inversion cycle of the cyclic signal as a fundamental cycle based on each output signal value having passed through each of the digital filters of the correlation filter means;
    inversion timing detection means for determining a polarity of each of the output signal values having passed through each of the digital filters of the correlation filter means to detect polarity inversion timing; and
    decision timing determination means for determining the timing detected by the inversion timing detection means as decision timing, when the maximum difference is detected by the maximum difference detection means.

2. The decision timing synchronous circuit according to claim 1, wherein the maximum difference detection means has a cycle extension portion for holding each of the output signal values from each of the digital filters and for extending the fundamental cycle to detect the maximum difference.

3. The decision timing synchronous circuit according to claim 1, wherein the inversion timing detection means has an interpolation portion for interpolating an intermediate value between each of the output signals based on each of the output signal values from each of the digital filters, and detects polarity inversion timing based on a polarity of a value including an interpolated value.

4. The decision timing synchronous circuit according to claim 1, comprising synchronization accuracy control means for adjusting a number of the parallel signal values while holding parallel signal intervals at equal intervals, based on each of the parallel signal values within one inversion cycle output from the serial-to-parallel conversion means, and for providing the adjusted number of the parallel signal values to the correlation filter means.

5. The decision timing synchronous circuit according to claim 4, wherein the synchronization accuracy control means decimates the parallel signal values at equal intervals so that the parallel signal interval is extended.

6. The decision timing synchronous circuit according to claim 5, wherein the synchronization accuracy control means adds each of the parallel signal values accepted, in a particular partial period within one inversion cycle, to the parallel signal interval adjusted to have an extended signal interval, so that the parallel signal interval is reduced.

7. The decision timing synchronous circuit according to claim 4, wherein the synchronization accuracy control means decimates the parallel signal values at equal intervals to perform a coarse adjustment of synchronization accuracy, and determines a partial period within one inversion cycle based on the coarse adjustment result to perform a fine adjustment of synchronization accuracy in the partial period.

8. The decision timing synchronous circuit according to claim 7, wherein the synchronization accuracy control means receives a switching instruction to perform an adjustment switching between the coarse adjustment and fine adjustment of synchronization accuracy based on the switching instruction.

9. The decision timing synchronous circuit according to claim 1, comprising word detection means for acquiring a demodulated binary signal of the received modulated signal having been demodulated, using decision timing determined by the decision timing determination means, and for detecting a word by comparison with a predefined word pattern, thereby determining a decision timing based on the word detection.

10. The decision timing synchronous circuit according to claim 1, wherein the inversion timing detection means determines, as inversion timing, a position indicating an intermediate value between a maximum value and a minimum value of each of the output signal values output from each of the digital filters.

11. The decision timing synchronous circuit according to claim 1, wherein the inversion timing detection means determines, as inversion timing, a timing approximated before and after a timing at which a polarity of each of the output signal values output from each of the digital filters is inverted.

12. The decision timing synchronous circuit according to claim 1, wherein the inversion timing detection means detects inversion timing by comparison between magnitudes of each of the output signal values output from the digital filters.

13. A receiver circuit comprising:

binarization means for binarizing a received modulated signal supplied;

a decision timing synchronous circuit for determining decision timing based on the binary signal of the received modulated signal binarized by the binarization means; and demodulation means for demodulating the binary signal of the received modulated signal from the binarization means using the decision timing determined by the decision timing synchronous circuit, wherein the decision timing synchronous circuit corresponds to the decision timing synchronous circuit according to claim 1.

* * * * *